US 12,488,662 B1

(12) United States Patent
Bouskila et al.

(10) Patent No.: US 12,488,662 B1
(45) Date of Patent: Dec. 2, 2025

(54) ITEM DETECTION AND CART VALIDATION SYSTEM

(71) Applicant: TOSHIBA GLOBAL COMMERCE SOLUTIONS, INC., Durham, NC (US)

(72) Inventors: Yeshai Bouskila, Plano, TX (US); Yevgeni Tsirulnik, Frisco, TX (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/885,388

(22) Filed: Sep. 13, 2024

(51) Int. Cl.
| G07G 1/01 | (2006.01) |
| G06V 10/82 | (2022.01) |
| G06V 20/52 | (2022.01) |
| G07G 1/00 | (2006.01) |

(52) U.S. Cl.
CPC ............ G07G 1/01 (2013.01); G06V 10/82 (2022.01); G06V 20/52 (2022.01); G07G 1/0054 (2013.01)

(58) Field of Classification Search
CPC ........ G07G 1/01; G07G 1/0054; G06V 10/82; G06V 20/52
See application file for complete search history.

(56) References Cited

U.S. PATENT DOCUMENTS

| 11,481,751 B1 * | 10/2022 | Chaubard | G06V 10/82 |
| 2006/0261157 A1 * | 11/2006 | Ostrowski | G07G 1/0054 |
| | | | 235/383 |
| 2014/0021258 A1 * | 1/2014 | Olmstead | G06K 7/10544 |
| | | | 235/462.41 |
| 2021/0374699 A1 * | 12/2021 | Barkan | G06V 20/64 |
| 2022/0207595 A1 * | 6/2022 | Andronic | G07G 1/14 |
| 2022/0343660 A1 * | 10/2022 | Yang | G06V 10/70 |
| 2023/0297905 A1 * | 9/2023 | Brosnan | G06Q 20/20 |
| 2023/0386217 A1 * | 11/2023 | Brakob | G06Q 20/206 |
| 2024/0071185 A1 * | 2/2024 | Voss | G06F 18/241 |
| 2025/0005651 A1 * | 1/2025 | Morgan | G07G 1/0009 |

FOREIGN PATENT DOCUMENTS

WO  WO-2021097019 A1 *  5/2021 ......... G06Q 30/0633

* cited by examiner

*Primary Examiner* — Tuyen K Vo
(74) *Attorney, Agent, or Firm* — Patterson + Sheridan, LLP; Gero G. McClellan (57) ABSTRACT

The present disclosure provides techniques for tracking and verifying items that are scanned multiple times in a self-checkout system. A plurality of inputs indicating more than one scan of an item are received at a self-checkout machine. An image of a bagging area is captured. A CNN is trained to recognize the item based on a training dataset and a selected training algorithm. One or more units of the item are detected in the bagging area from the image using the CNN. A number of the detected units of the item in the bagging area is compared with a number of times the item has been scanned. Upon determining that there is no match, a shopping list displayed on the self-checkout machine is adjusted to reflect the number of the detected units of the item in the bagging area.

20 Claims, 8 Drawing Sheets

ITEM DETECTION AND CART VALIDATION SYSTEM

BACKGROUND

When customers purchase multiple units of the same product at a self-checkout machine, they often scan one item multiple times before placing all the items together in the bagging area. This approach saves time and is more convenient because it reduces the need to repeatedly scan the same items. However, it also introduces potential errors. For example, a customer may mistakenly scan one item more times than he or she actually intends to purchase, resulting in an overcharge. Alternatively, the customer may accidentally miss a scan, such as when intending to buy three boxes of cereal but only scanning twice, leading to an undercharge. These errors may disrupt the self-checkout shopping experience, prompting the customer to seek staff assistance to correct the issues, and may also create discrepancies in inventory management for the store.

DETAILED DESCRIPTION

Self-checkout systems typically require customers to place their shopping carts or baskets in the loading area, scan each item individually, and then place the scanned items into the bagging area. When customers purchase multiple units of the same product with the same barcode, such as three boxes of cereal, they often scan one box multiple times before placing all of the boxes together in the bagging area. This approach may cause potential errors, such as discrepancies between the number of times an item is scanned and the actual quantity placed in the bagging area. These errors may lead to incorrect charges, delays, or the need for manual intervention to correct the transaction.

The present disclosure introduces a system and techniques for tracking items scanned multiple times at a self-checkout machine, verifying whether the number of items in the bagging area matches the scanned quantity, and automatically adjusting the shopping list to reflect the correct number. More specifically, in one embodiment, one or more cameras may be integrated with a self-checkout machine to monitor the bagging area. Upon detecting that an item has been scanned multiple times, the disclosed system may analyze the captured images to determine the correct number of the scanned items that have been placed in the bagging area. If a discrepancy is found, the system may automatically update the shopping list and/or prompt a notice to remind the customer to double-check the items in the bagging area. By implementing these techniques, the disclosed system improves the accuracy and efficiency of the self-checkout process, preventing potential errors such as overcharging the customer and reducing the need for manual verification.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the described embodiments may take the form of an entirely hardware embodiment, an entirely software embodiment (including firmware, resident software, microcode, etc.) or an embodiment combining software and hardware aspects that may generally be referred to herein as a "circuit," "module" or "system."

Figure 1:
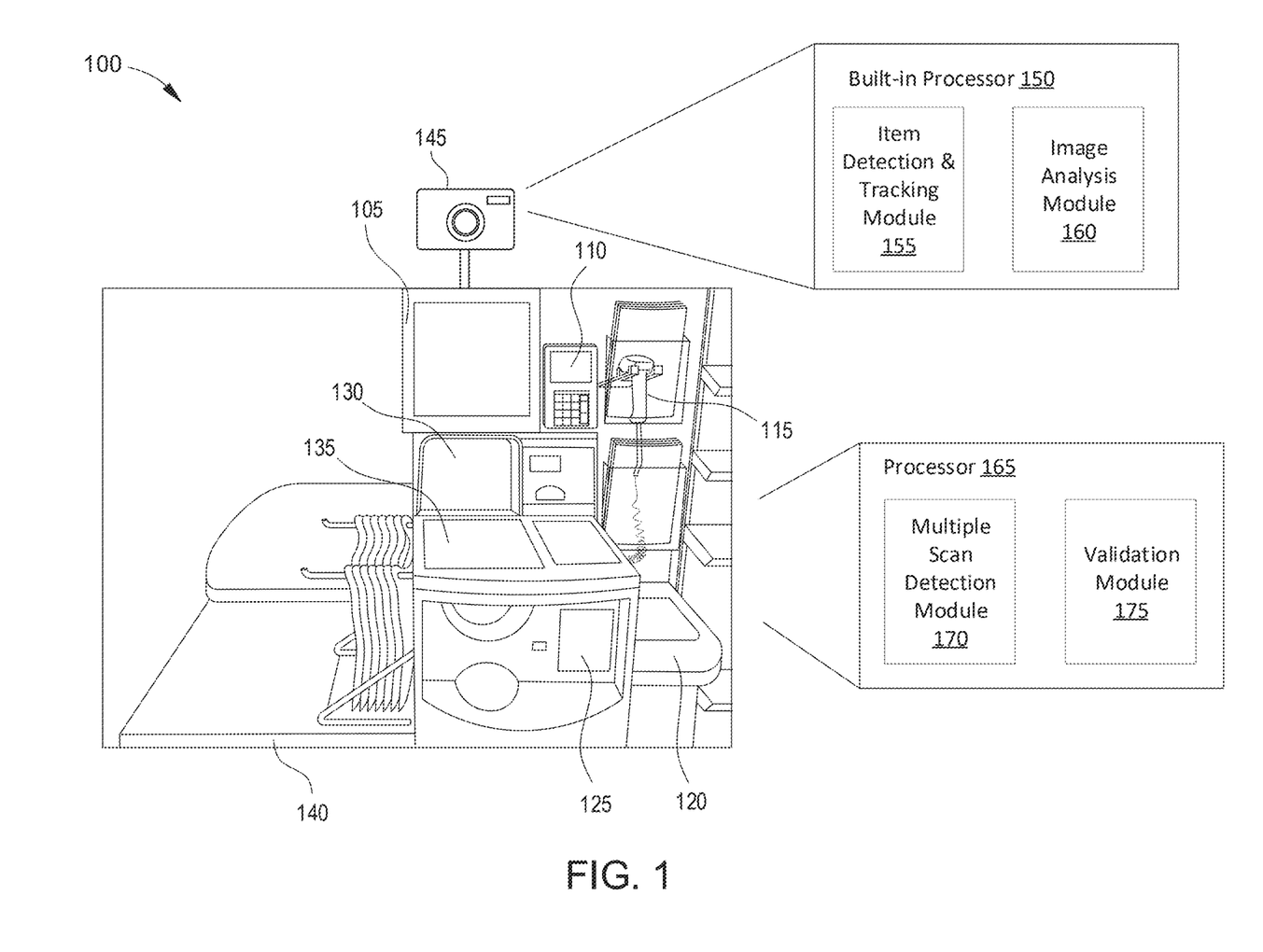
FIG. 1 depicts an example self-checkout machine with an integrated camera for tracking the quantity of multiple scanned items, according to some embodiments of the present discourse.

FIG. 1 depicts an example self-checkout machine 100 with an integrated camera 145 for tracking the quantity of multiple scanned items, according to some embodiments of the present discourse.

As illustrated, the example self-checkout machine 100 includes various components designed to streamline the checkout process, including: a loading area 120, a bagging area 140, a screen 105, a built-in scanner 130, a handheld scanner 115, a scale 135, a payment terminal 110, a receipt printer 125, and an integrated camera 145 with a built-in processor 150.

The loading area 120 is used to hold a customer's shopping cart or basket before items are scanned. The bagging area 140 is used to place items after they have been scanned. The screen 105 displays a shopping list that shows details, such as each scanned item, its quantity and individual price, and the total price of all items. The customer may use the shopping list to verify their purchase in real-time.

The built-in scanner 130 and handheld scanner 115 are used to scan one-dimensional (1D) or two-dimensional (2D) barcodes on products. Once scanned, the product's name and price are displayed on the screen 105 within the shopping list. The scale 135 is used to weigh items to determine their final price. The payment terminal 110 is used for processing payments, and the receipt printer 125 provides a physical receipt after the transaction is complete.

The integrated camera 145 is used to monitor the bagging area 140. As illustrated, the integrated camera 145 consists of a built-in processor 150 that includes an item detection and tracking module 155 and an image analysis module 160. The item detection and tracking module 155 is configured to monitor items as they are placed in the bagging area 140, and the image analysis module 160 is configured to process captured images of the bagging area 140 to identify and count the items present.

As depicted, the self-checkout machine 100 also includes a processor 165 that contains a multiple scan detection module 170 and a validation module 175. The multiple scan detection module 170 is designed to detect whether, within a single transaction, a customer scans the same item multiple times. As used herein, scanning the same item multiple times may include scanning multiple instances or physical copies of the same item once each (e.g., scanning three boxes of cereal) or scanning the same physical item multiple times (e.g., scanning the same box of cereal three times). The validation module 175 receives the detected item count from the camera 145 and determines whether it matches the scanned count.

When a customer scans one item multiple times using the scanner (e.g., 130 or 115 of FIG. 1), the camera 145 and the self-checkout machine 100 work together to ensure an accurate transaction. In some embodiments, the multiple scan detection module 170 may monitor the scanning process and identify whether one item has been scanned multiple times. For example, if a customer scans one box of cereal three times (or three identical boxes of cereal once each), the same input may be provided to the self-checkout system three times, whether consecutively or non-consecutively. Based on this, the multiple scan detection module may identify that the cereal has been scanned multiple times. Upon identifying multiple scans, the multiple scan detection module 170 may alert the camera 145, which then uses the item detection and tracking module 155 to monitor the placement of the scanned item(s) (e.g., box(es) of cereal) in the bagging area and capture images. The captured images may then be processed by the image analysis module 160, which identifies the presence of the items (e.g., boxes of cereal) and counts the number (e.g., three). In some embodiments, a convolutional neural network (CNN) may be used to perform the detection and counting. After processing, the image analysis module 160 may send the item count to the self-checkout machine, where the validation module 175 compares the detected count with the scanned count. If a discrepancy is found, the validation module 175 may instruct the self-checkout machine to update the shopping list (e.g., displayed on the screen 105) to reflect the correct number of items or generate an alert (e.g., displayed on the screen 105) for the customer to check the bagging area.

In some embodiments, the camera 145 may continuously monitor the bagging area 140 without the need for a trigger from the multiple scan detection module 170. In this configuration, the camera 145 may capture every item placed in the bagging area 140 regardless of whether it has been scanned multiple times. The camera 145 may then identify the item, count its quantity, and send this information back to the self-checkout machine 100 for validation. This approach may be resource-intensive and only be implemented in environments where high accuracy for item tracking is required. By selectively enabling the image capture and analysis in some aspects, the computational expense (e.g., memory footprint, processor time, and the like) of the system can be significantly reduced, as well as reducing resource consumption (e.g., power consumption) and/or reducing other side effects of the analysis, such as excess heat generation by the computing system.

FIG. 1 showing one camera 145 integrated with the self-checkout machine 100 is provided for conceptual clarity. In some embodiments, more than one camera may be integrated with the self-checkout machine 100 to monitor its bagging area 140 from different angles. The large amount of data generated may exceed the processing capacity of the built-in processor within each camera. In this configuration, the image analysis operations may be performed by the processor of the self-checkout machine or an external server (e.g., connected to the self-checkout machine through a gateway).

Figure 2A:
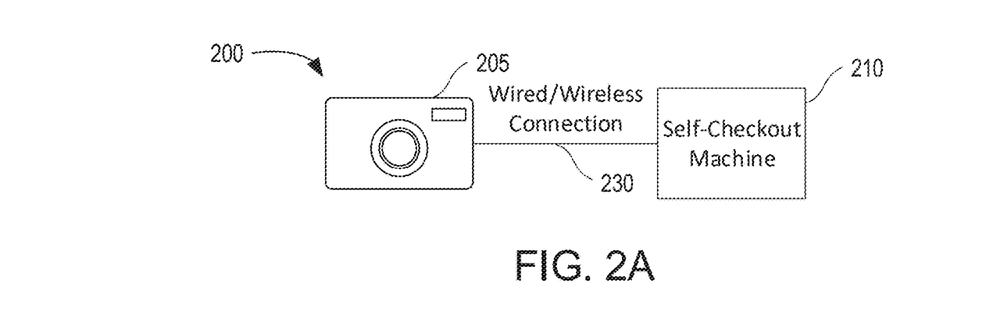
FIGS. 2A and 2B show example connection mechanisms between one or more integrated cameras and a self-checkout machine, according to some embodiments of the present discourse.
Figure 2B:
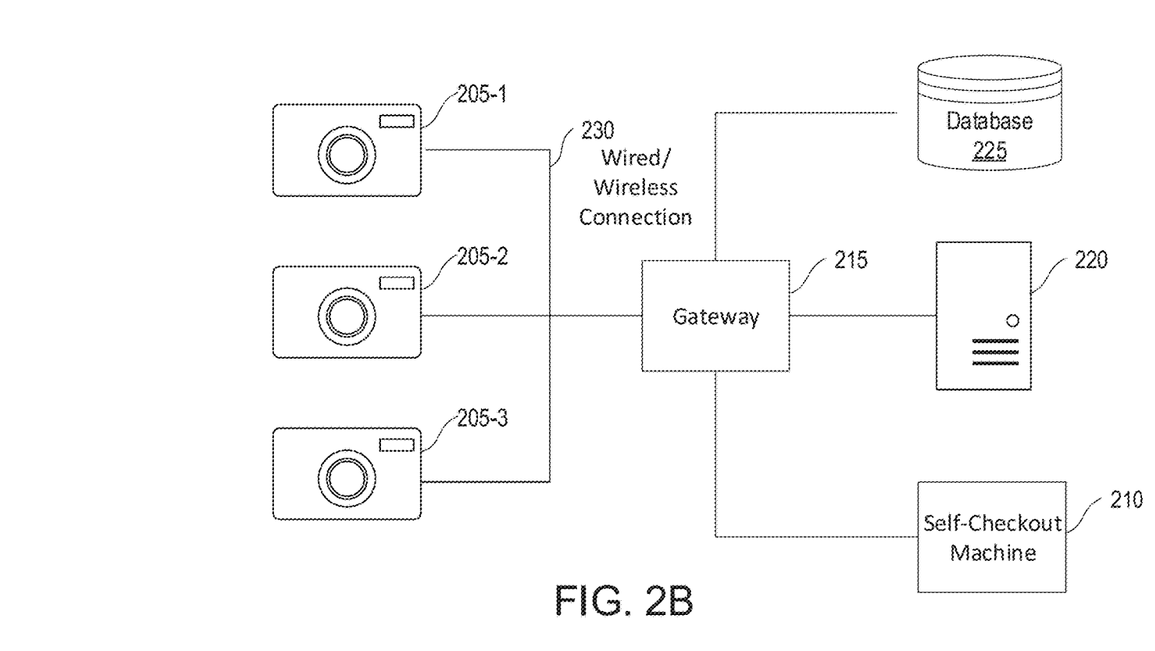

FIGS. 2A and 2B show example connection mechanisms between one or more integrated cameras 205 and a self-checkout machine 210, according to some embodiments of the present discourse.

FIG. 2A depicts an example of a direct wired (or wireless) connection 230 between a self-checkout machine 210 and a camera 205. Through the connection, the self-checkout machine 210 may indicate to the camera that a specific item (e.g., a box of cereal) has been scanned multiple times within a single transaction. Upon receiving this indication, the camera 205 may begin to monitor the bagging area and capture images. Alternatively, in some embodiments, the camera 205 may continuously monitor the bagging area without waiting for the detection of multiple scans.

When the camera 205 is configured with a built-in processor (e.g., 150 of FIG. 1), the camera 205 may perform image analysis to identify the presence of the scanned items (e.g., boxes of cereal) and count the number of units (e.g., three) placed in the bagging area. The camera 205 may then send the analyzed data, such as item identification and count, to the self-checkout machine 210 through the wired (or wireless) connection 230. In embodiments where the camera 205 does not have a built-in processor or the built-in processor does not have sufficient capacity for performing complex image analysis, the camera 205 may send the captured images through the wired (or wireless) connection 230 to the self-checkout machine 210, where the image analysis is performed. As used herein, the wired connection may refer to a cable, such as an Ethernet cable, which provides a stable and secure link. As used herein, the wireless connection may refer to technologies such as Wi-Fi and Bluetooth that offer flexibility in placement and installation.

FIG. 2B depicts an example configuration where multiple cameras 205-1, 205-2, and 205-3 are connected to a gateway 215 via wired (or wireless) connections 230. Through this gateway 215, the cameras 205-1, 205-2, and 205-3 are connected to a self-checkout machine 210, an external server 220 for running complex image analysis for item identification and counting, and a database 225 for storing the captured images and the data generated from the analysis.

The example configuration is useful in embodiments where more than one camera 205 is integrated with a self-checkout machine 210 to monitor the bagging area. This setup may lead to the generation of large amounts of image data that need to be processed. The image data may then be routed through the gateway 215 to the external server 220, which analyzes the data to determine the presence of the scanned items (e.g., boxes of cereal) and counts the number of units (e.g., three) placed in the bagging area. After the identification, the external server 220 may send the analysis results, through the gateway 215, to the self-checkout machine 210 for validation. Additionally, the processed data and the captured images may be sent, through the gateway 215, to the database 225 for record-keeping and future analysis.

Figure 3:
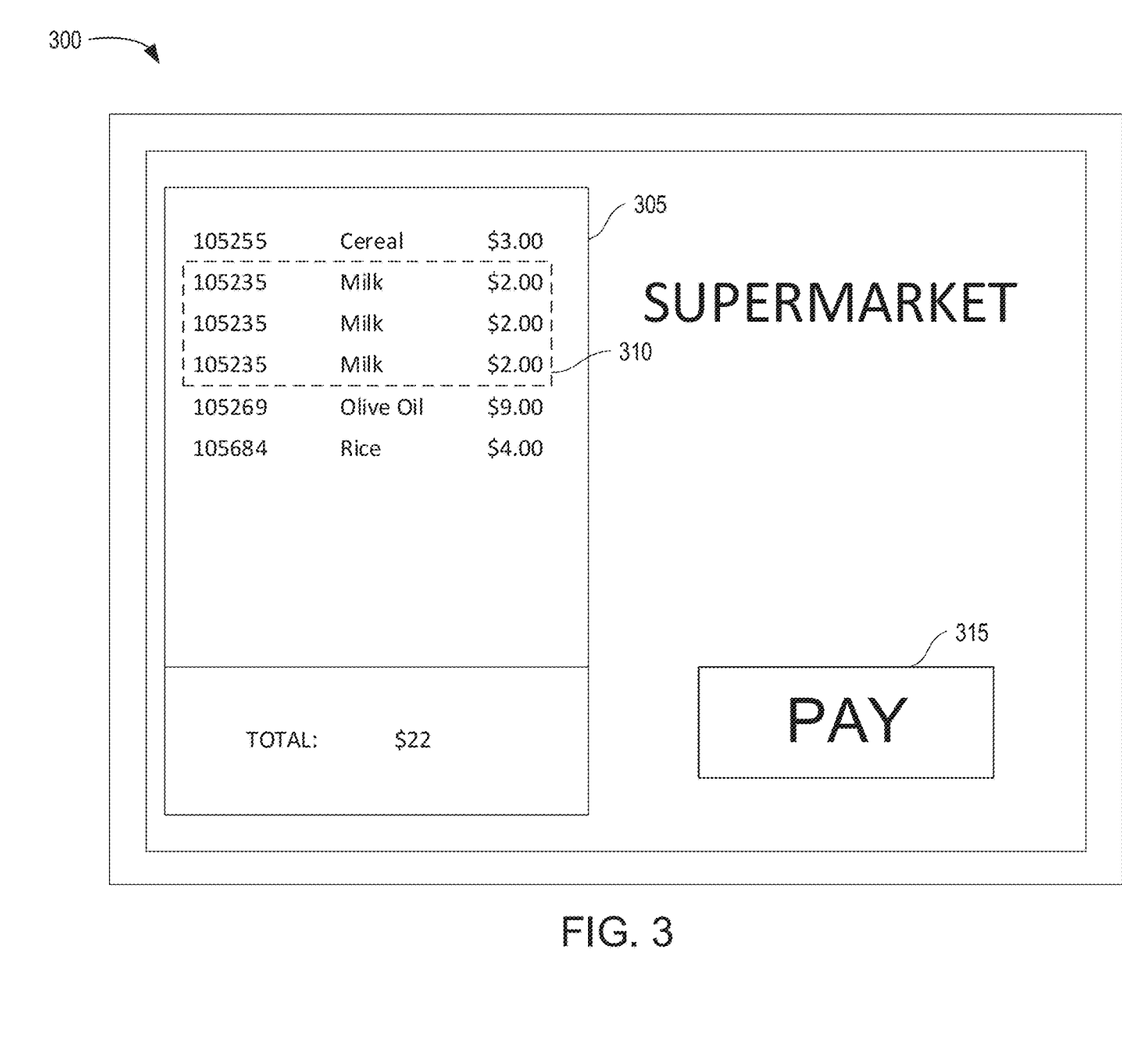
FIG. 3 depicts an example display with a graphical user interface (GUI) of a self-checkout machine displaying a shopping list with multiple entries for the same product, according to some embodiments of the present discourse.

FIG. 3 depicts an example display with a GUI 300 of a self-checkout machine displaying a shopping list 305 with multiple entries 310 for the same product, according to some embodiments of the present discourse.

As depicted, the left side of the screen 300 displays a shopping list 305, which is organized into three columns at the top: the first column is for the reference number of the item (e.g., "105255"), the second column is for the item name (e.g., "Cereal"), and the third column is for the price (e.g., "$3"). At the end of the shopping list, the total price is displayed. As the customer scans items using a barcode scanner (e.g., the handheld scanner 115 or built-in scanner 130 of FIG. 1), the shopping list 305 is updated in real-time to include the scanned items.

As depicted, the right side of the screen 300 shows the store's name, along with a "PAY" button 315 for the customer to proceed to payment.

Within FIG. 3, the shopping list 305 shows three consecutive entries 310 for "Milk". Upon receiving these entries 310, the multiple scan detection module (e.g., 170 of FIG. 1) within the self-checkout machine may consider this as an indicator that the customer has scanned one carton of milk three times. Based on this, the integrated camera (e.g., 145 of FIG. 1) within the self-checkout machine may be activated to monitor the bagging area (e.g., 140 of FIG. 1), capturing images to verify that the correct number of items have been placed.

In some embodiments, multiple scans may be identified even when the entries are not consecutive. For example, if the shopping list 305 shows items like "Cereal," "Milk," "Coke," followed by two additional "Milk" entries, as long as there are multiple entries for the same item in a single transaction, the multiple scan detection module (e.g., 170 of FIG. 1) may still recognize that "Milk" has been scanned three times and trigger the camera (e.g., 145 of FIG. 1) to monitor the placement of these items in the bagging area. In some embodiments, the camera (e.g., 145 of FIG. 1) may continuously monitor the bagging area and capture images regardless of whether multiple scans have been detected. In this configuration, the camera may provide a constant check on the placement of items to prevent errors.

In some embodiments, the captured images may then be analyzed to identify the actual number of units in the bagging and compared with the scanned number. If there is no match, particularly when the scanned number is higher than the detected number, it may suggest that the customer accidentally scanned an item more times than intended. To prevent overcharging and avoid manual intervention, the self-checkout machine may automatically update the shopping list 305 (e.g., displayed on its screen 300) to reflect the correct number. For example, if it is determined that only two cartons of milk are present in the bagging area, the shopping list 305 may be adjusted to remove the extra entry for a third carton of milk.

Figure 4:
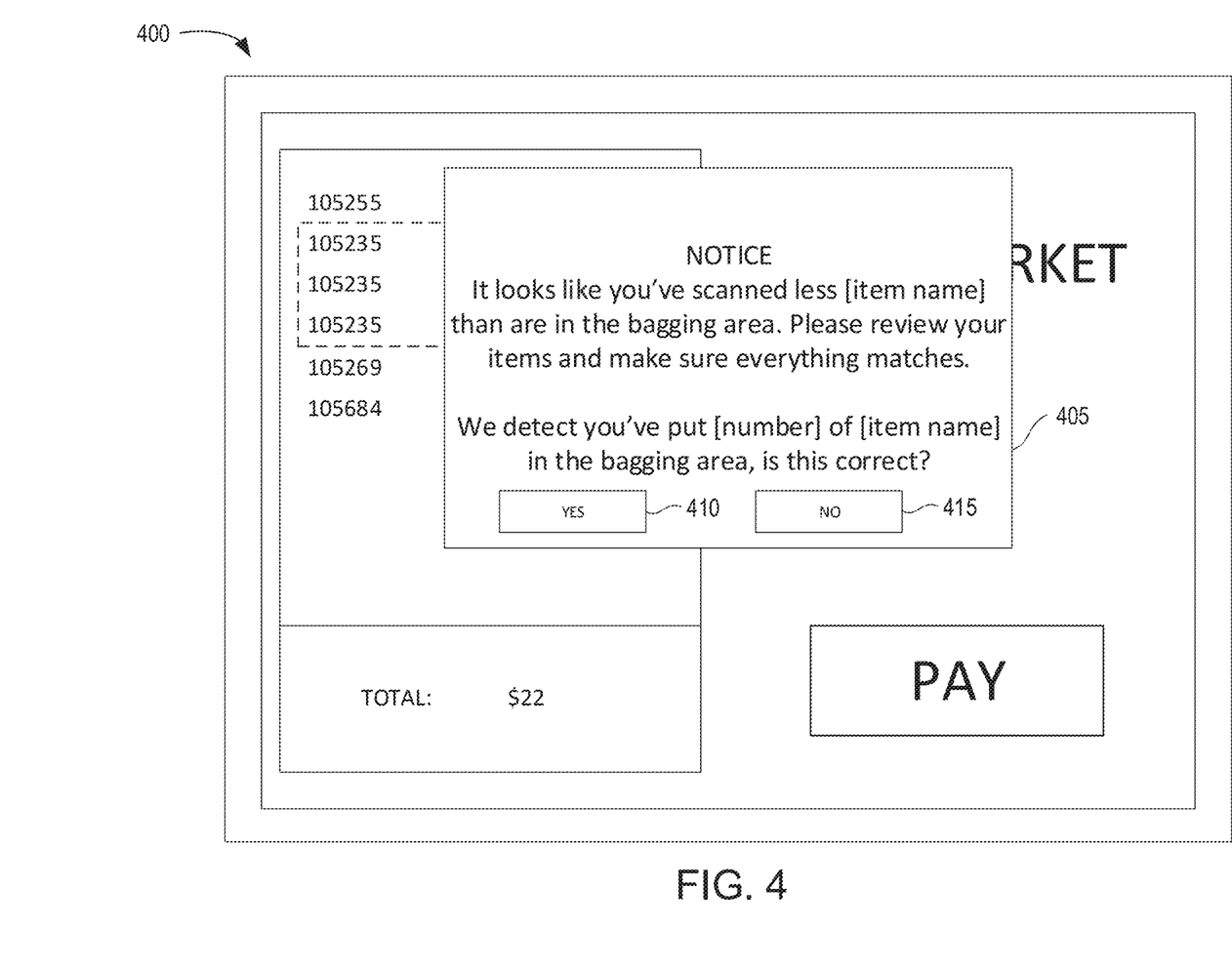
FIG. 4 depicts an example display with a GUI of a self-checkout machine displaying a notice alerting that the scanned count for an item does not match the detected count, according to some embodiments of the present discourse.

FIG. 4 depicts an example screen 400 of a self-checkout machine displaying a notice 405 alerting that the scanned count for an item does not match the detected count, according to some embodiments of the present discourse.

As discussed above, the integrated camera (e.g., 145 of FIG. 1) of a self-checkout machine may monitor the bagging area (e.g., 140 of FIG. 1), and capture images that are then processed to identify the presence and count of the specific item that has been scanned multiple times (e.g., the "Milk" as depicted in FIG. 3). The self-checkout machine may then compare the detected count of this item with the scanned count. The depicted notice 405 may be generated when there is no match, particularly when the scanned count is lower than the detected count, indicating that the customer may have unintentionally scanned fewer times than they should have. This notice 405 may be displayed on the screen 400 of the self-checkout machine to remind the customer to double-check the items (e.g., cartons of milk) in the bagging area and ensure that all items are properly scanned and accounted for.

As depicted, the notice 405 may include two parts. The first part notifies the customer that he or she has scanned fewer items than are actually present in the bagging area. The second part indicates that the system has detected a specific number of items in the bagging area and asks the customer to confirm this count. If the customer clicks the "YES" button 410, the shopping list may be automatically updated to reflect the detected number. However, if the customer clicks the "NO" button 415, an alert may be sent to the administrative system, informing staff or employees that manual verification is required to resolve the discrepancy.

Figure 5:
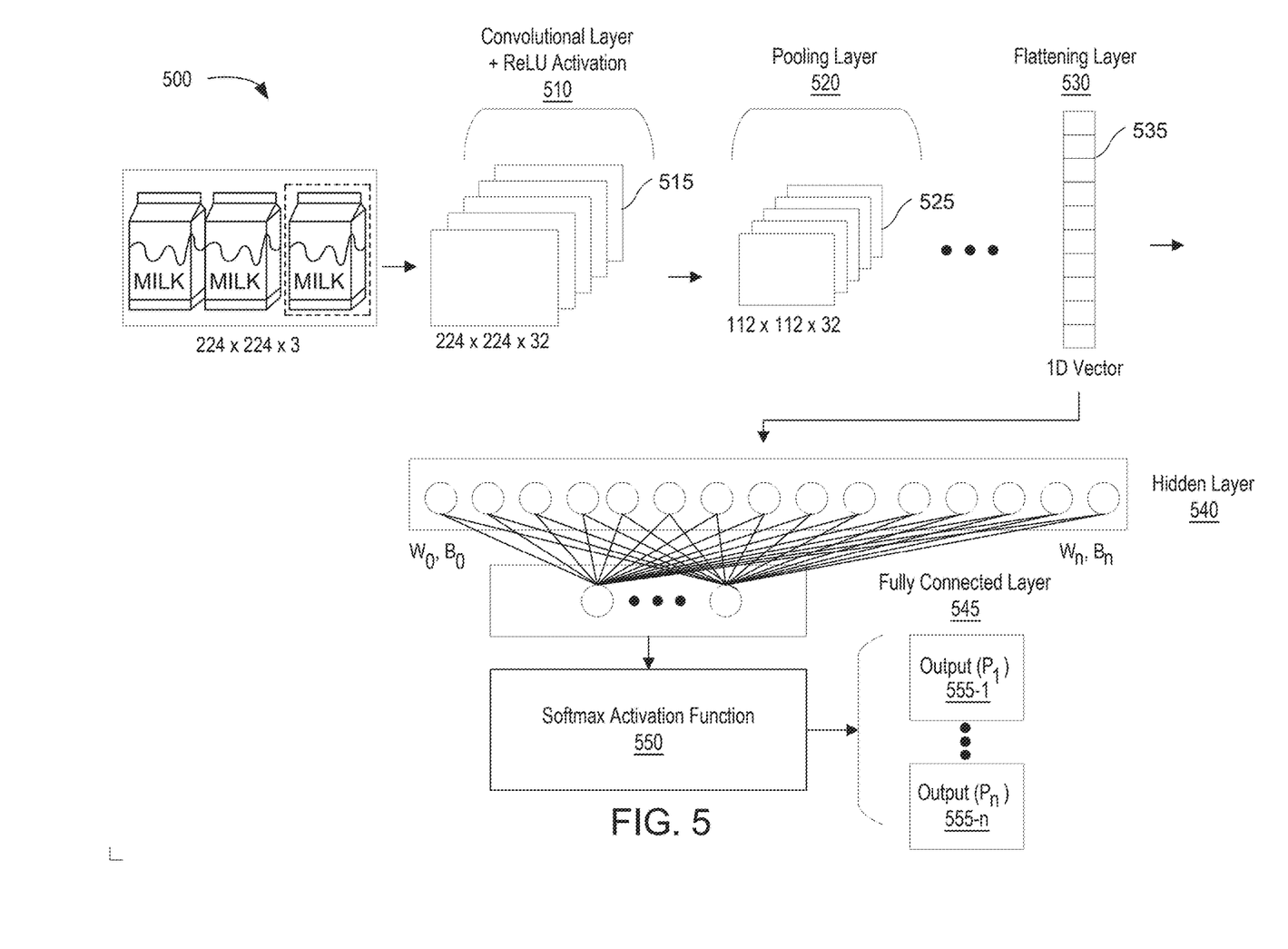
FIG. 5 depicts an example convolutional neural network (CNN) that processes images of a bagging area to determine the presence and quantity of an item, according to some embodiments of the present discourse.

FIG. 5 depicts an example convolutional neural network (CNN) 500 that processes images 505 of a bagging area to determine the presence and quantity of an item, according to some embodiments of the present discourse.

As depicted, the input image 505 shows three cartons of milk. In some embodiments, the input image 505 may be captured by the camera (e.g., 145 of FIG. 1) of a self-checkout machine. The input image 505 may show items placed in the bagging area (e.g., 140 of FIG. 1), including the specific item (e.g., milk) that has been scanned multiple times. As illustrated, the input image 505 has dimensions of 224×224×3.

The input image is first provided to a convolutional layer with ReLU activation 510, where 32 filters of size 3×3 are applied. This operation generates a feature map 515 with dimensions of 224×224×32, which highlights the "key" features detected in the input image 505. The feature map 515 is then processed through a pooling layer 520, where max pooling with a 2×2 window is applied to reduce the spatial dimensions. The output of the pooling layer has dimensions of 112×112×32. Following that, one or more additional convolutional layers with ReLU activation and pooling layers may be added to further refine the feature extraction and/or reduce the dimensions.

The output of the last convolutional or pooling layer is then flattened, through the flatten layer 530, into a 1D vector 535. A hidden layer 540 with a certain number of neurons (e.g., 128 neurons) applies learned weights (w) and biases (b) to the flattened vector 535. In some embodiments, one or more hidden layers 540 may be added to refine the prediction. The output of the hidden layer 540 is passed to a fully connected layer 545 with multiple neurons, where each neuron corresponds to a class of items.

The outputs of these neurons are then provided to a softmax activation function 550, which transforms each output into a probability distribution between 0 and 1. Each value 555 represents the likelihood of each item class (e.g., "milk," "cereal," or "bread") being present in the input image 505. The class with the highest probability is selected as the final prediction. For example, if the highest probability corresponds to "milk," the system determines that the image most likely contain a carton of milk.

In some embodiments, the fully connected layer 545 may comprise a single neuron when a binary classification problem is involved. In this configuration, the output of the single neuron is provided to a sigmoid activation function, which transforms the output into a value between 0 and 1. The value represents a probability indicating the presence of a specific item (e.g., a carton of milk) in the input image 505. A probability close to 1 may indicate a high likelihood that the item is present, and a value close to 0 may suggest that the item is not present. In some embodiments, an else-if condition may be applied to the final output (P) 555 when sigmoid function is used: if P falls within the range [0, 0.5], the network may determine that the item is not present; if P falls within the range [0.5, 1], the network may determine that the item is present.

In some embodiments, to count the quantity of the item in the bagging area, the input image 505 may be divided into regions, and each region may be processed independently through the network. As depicted, the input image 505 shows three cartons of milk. The input image 505 may be separated into three regions, with each region (e.g., 505-1) processed independently through the network. The activation function (e.g., sigmoid function or softmax function) may be run three times, once for each region. The number of regions where the probability P 555 exceeds the threshold (e.g., 0.5) may then be used to determine the total number of items (e.g., three cartons of milk).

In some embodiments, the CNN 500 may be trained using historical image data. The training process may involve providing the CNN 500 with a large datasets of labeled images, such as images showing various items (e.g., milk, cereal). Each image in the dataset is labeled with the correct item. During training, the CNN may learn to extract the relevant features from these images (e.g., shapes, textures, and patterns) that are associated with each specific item. By processing numerous images that display the same item in different conditions (e.g., different lighting, angles), the CNN may learn to correlate these features with the correct item labels. The learning process may include iterative adjustments to the network's parameters, such as the weights (w) and bias (b) of neurons in the hidden layer 540, to minimize the error between the predicted outputs 555 and the actual labels. Once trained, the CNN 500 may be integrated into the image analysis module (e.g., 160 of FIG. 1), where it applies learned knowledge to real-time images captured by the self-checkout machine's camera (e.g., 145 of FIG. 1).

In some embodiments, the depicted CNN 500 may be trained and/or deployed on a machine learning (ML) application specific integrated circuit (ASIC) or CNN circuitry, The ML ASIC and/or CNN circuitry may be configured to optimize performance by accelerating the training and/or inference processes. These hardware implementations may enable the CNN 500 more suitable for real-time applications like item detection and counting in a self-checkout system.

Figure 6:
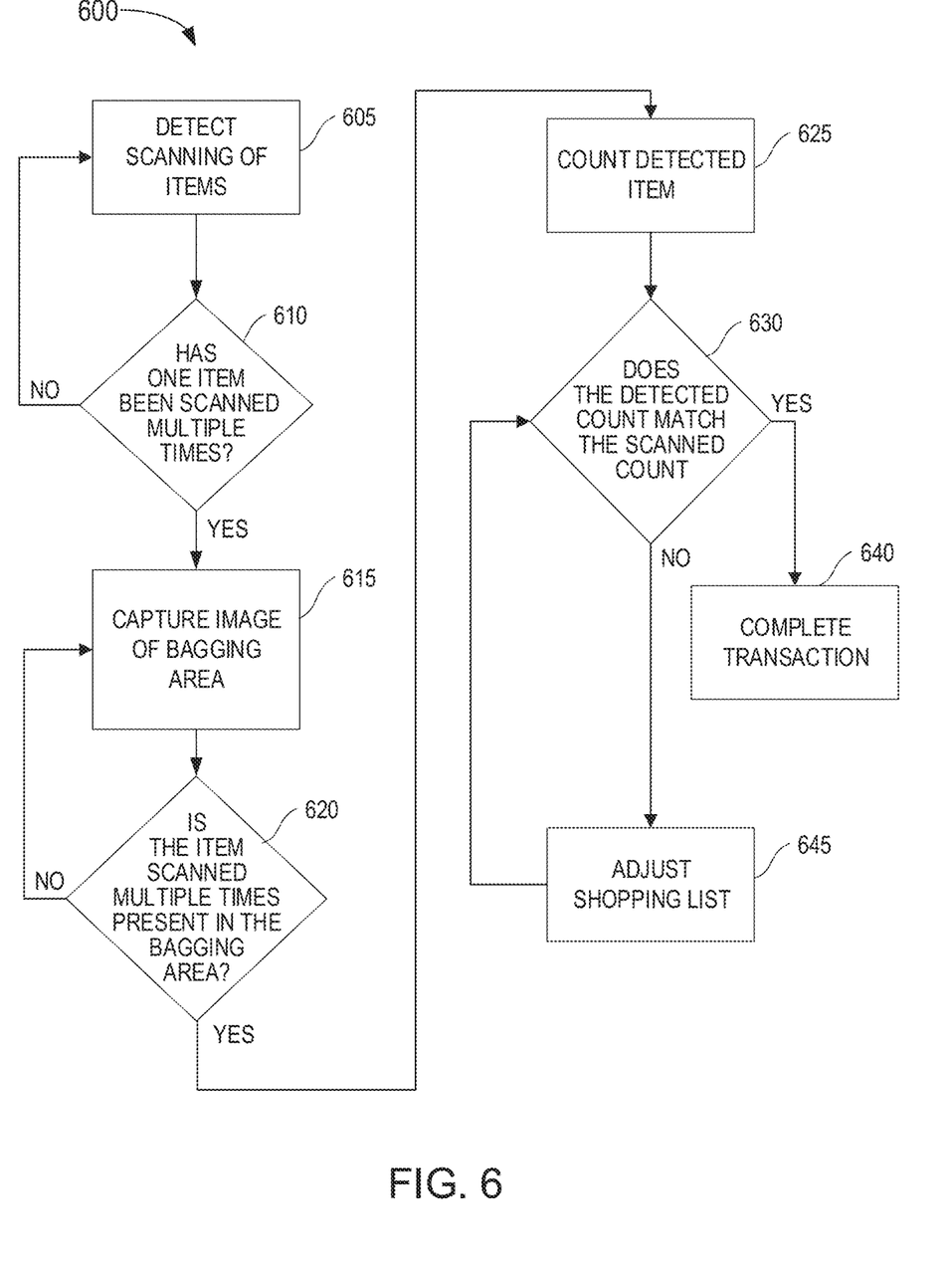
FIG. 6 depicts an example method for monitoring and verifying the placement of items in a bagging area after multiple scans in a self-checkout system, according to some embodiments of the present discourse.
Figure 8:
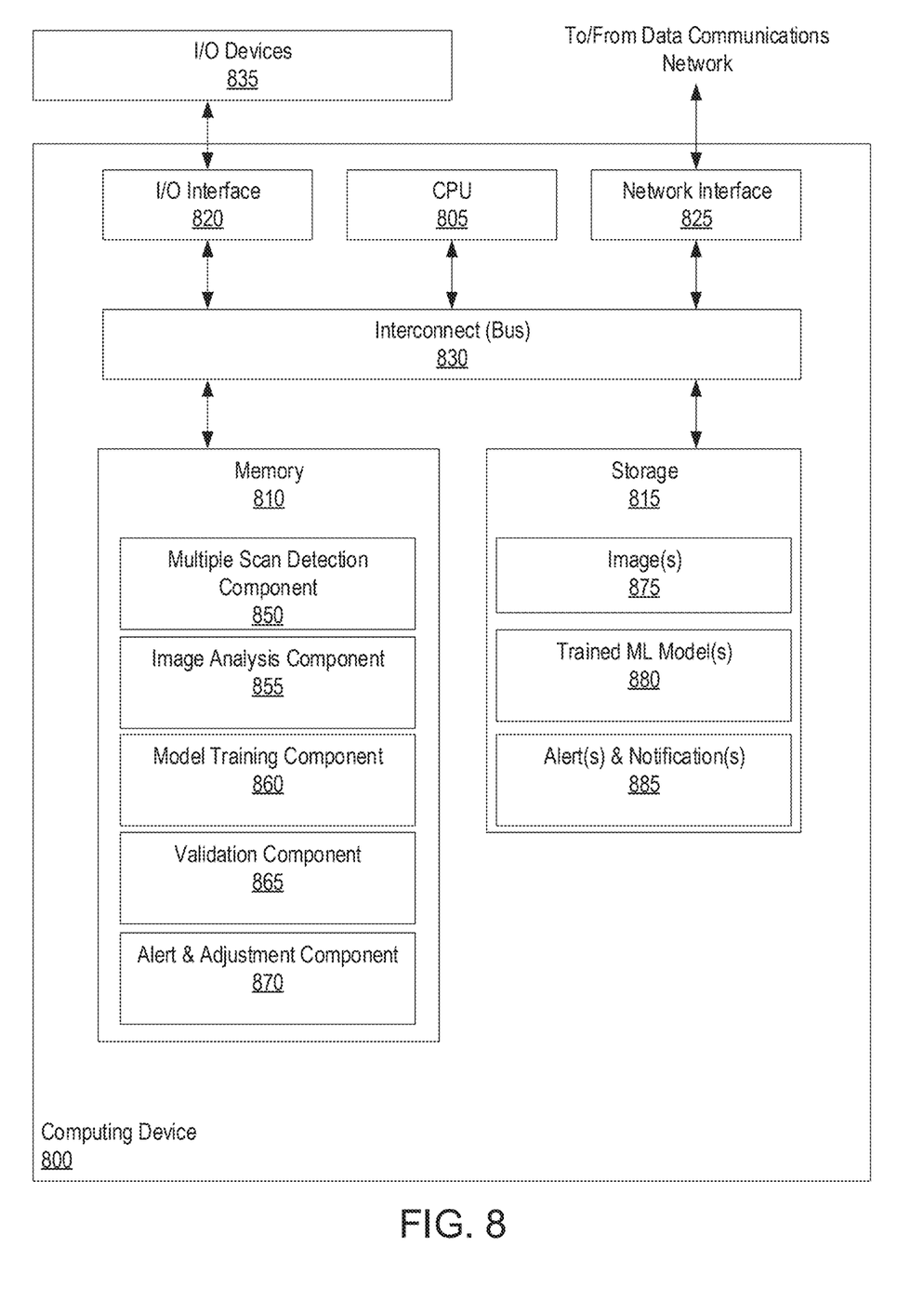
FIG. 8 depicts an example computing device configured to perform various aspects of the present disclosure, according to some embodiments of the present disclosure.

FIG. 6 depicts an example method 600 for monitoring and verifying the placement of items in a bagging area after multiple scans in a self-checkout system, according to some embodiments of the present discourse. In some embodiments, the method 600 may be performed by one or more computer systems or devices, such as the self-checkout machine 100 or the camera 145 as illustrated in FIG. 1, the self-checkout machine 210 or the camera 205 as illustrated in FIGS. 2A and 2B, the external server 220 as illustrated in FIG. 2B, or the computing device 800 as illustrated in FIG. 8.

At block 605, a computer device detects whether a customer scanned an item using a barcode scanner (e.g., 115 or 130 of FIG. 1). Each scan updates the device's records and the shopping list (e.g., 305 of FIG. 3) displayed on the screen (e.g., 105 of FIG. 1).

At block 610, the computer device determines whether the same item has been scanned multiple times within the same transaction. In some embodiments, the multiple scans may be detected by receiving multiple consecutive entries for the same product (e.g., 315 of FIG. 1). In some embodiments, the multiple scans may be detected by receiving non-consecutive entries for the same product, as long as these entries are within the same transaction. If multiple scans of the same item are detected, the method 600 proceeds to block 615, where the device's camera (e.g., 145 of FIG. 1) is activated to capture one or more images of the bagging area (e.g., 140 of FIG. 1). The images may show the items that have been placed in the bagging area, including the specific item (e.g., milk) that was scanned multiple times. If no multiple scans are detected, the method 600 returns to block 605, where the computer device continues to monitor for future scans and updates the shopping list accordingly.

In some embodiments, operations at blocks 605 and 610 may be omitted, and the camera may continuously capture images of the bagging area regardless of whether multiple scans are detected. The continuous monitoring may provide a constant check on the placement of items, and may be used when high accuracy for item tracking is required.

At block 620, the computer device analyzes the captured images to detect the presence of the specific item (e.g., milk) that was scanned multiple times. In some embodiments, trained ML models such as CNN (e.g., 500 of FIG. 5) may be used to process the images to extract features, and determine whether the item is present in the bagging area. If the item is detected, the method 600 proceeds to block 630. If the item has not been detected, it may indicate that the item has not yet been placed in the bagging area (e.g., possibly because the customer is still in the process of scanning). The method 600 returns to block 615, where the camera of the device continues to capture images of the bagging area until the item is detected.

At block 625, the computer device counts the quantity of the detected items in the bagging area. In some embodiments, the counting process may include separating the captured images into regions, with the trained ML model like CNN (e.g., 500 of FIG. 5) independently analyzing each region to determine if it contains the item and then counting the number of items present. In some embodiments, both the detection of presence and counting of items may be performed simultaneously at block 615 during the initial image analysis.

At block 630, the computer device compares the detected count with the number of times the item (e.g., milk) was scanned. If the detected count matches the scanned count, the method 600 proceeds to block 635, where the transaction can be completed. The customer may click the "PAY" button (e.g., 315 of FIG. 3) on the device's screen to proceed with payment.

If there is a discrepancy between the detected count and the scanned count, such as the customer scanning the item more times than the actual number placed in the bagging area, the method 600 proceeds to block 640.

At block 640, the computer device automatically adjusts the shopping list (e.g., 305 of FIG. 3) to reflect the correct quantity and avoid overcharging. For example, if three cartons of milk were scanned but only two were detected in the bagging area, the shopping list may be updated to reflect only two cartons of milk.

In embodiments where the discrepancy suggests that the customer scanned the item fewer than the actual number placed in the bagging area, the computer device may generate a notice (e.g., 405 of FIG. 4) and display the notice on the screen to remind the customer to double-check the bagging area. In some embodiments, the notice may also indicate the number of items detected in the bagging area, and the customer may have the option (e.g., the "Yes" button 410 and the "No" Button 415 of FIG. 4) to click and update the shopping list accordingly, without the need of manual verification. After adjusting the shopping list, the method 60 returns to block 630, where the computer device rechecks whether the detected count matches the updated scanned count. The recheck ensures that all discrepancies have been resolved and that the transaction is accurate before proceeding to completion.

In some embodiments, such as when the customer disputes the detected count in the bagging area (e.g., by clicking the "NO" button 415 of FIG. 4), the computer device may generate an alert, and send the alert to the administrative system, informing staff or employees that manual verification is required at a specific self-checkout machine.

Figure 7:
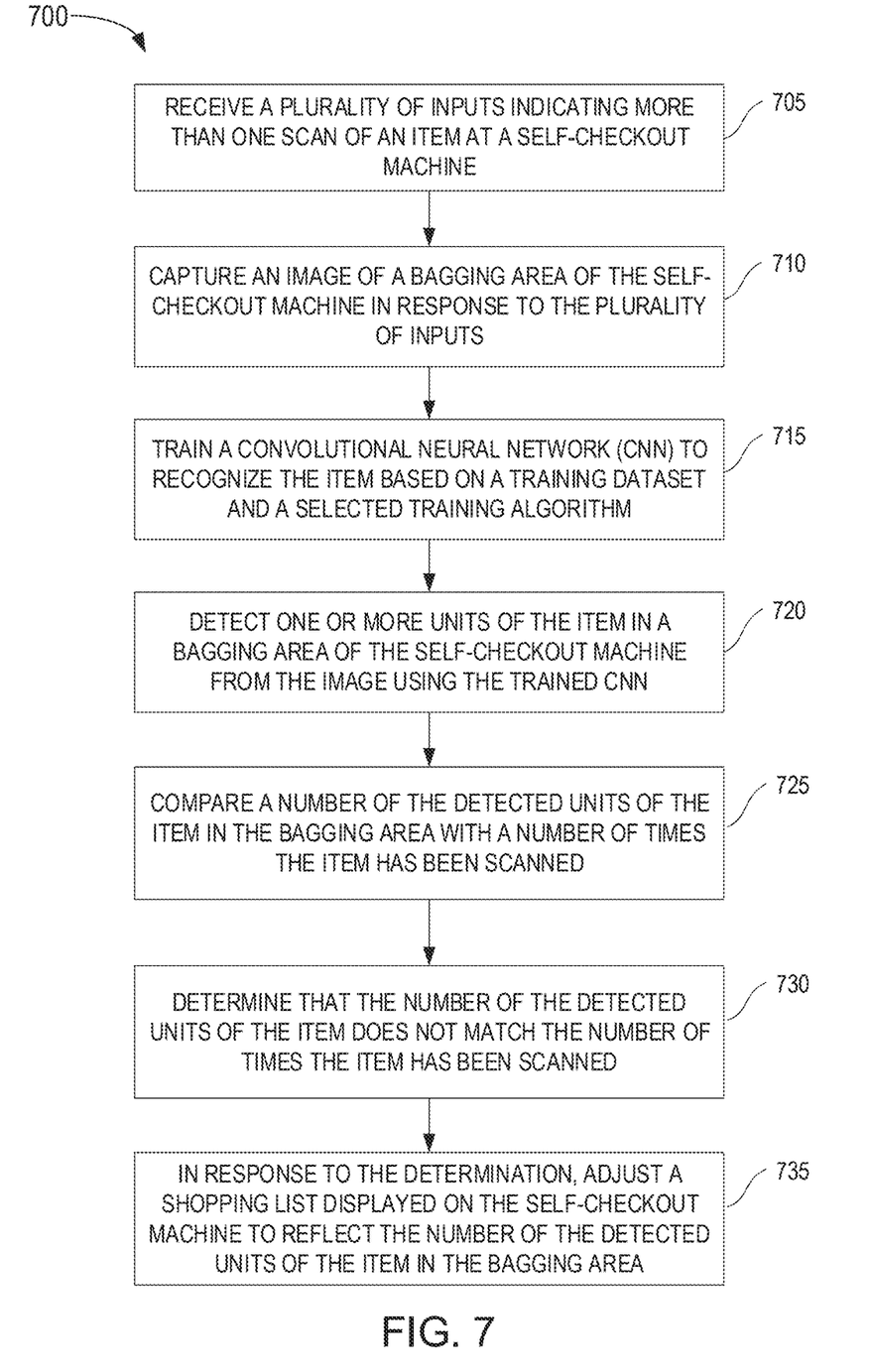
FIG. 7 is a flow diagram illustrating an example method for validating the quantity of multiple scanned items, according to some embodiments of the present disclosure.

FIG. 7 is a flow diagram illustrating an example method 700 for validating the quantity of multiple scanned items, according to some embodiments of the present disclosure.

At block 705, a computer device receives a plurality of inputs (e.g., 310 of FIG. 3) indicating more than one scan of an item at a self-checkout machine (e.g., 100 of FIG. 1).

At block 710, the computer device captures an image of a bagging area (e.g., 140 of FIG. 1) of the self-checkout machine in response to the plurality of inputs.

At block 715, the computer device trains a convolutional neural network (CNN) (e.g., 500 of FIG. 5) to recognize the item based on a training dataset and a selected training algorithm.

At block 720, the computer device detects one or more units of the item in the bagging area from the image using the trained CNN (e.g., 500 of FIG. 5).

At block 725, the computer device compares a number of the detected units of the item in the bagging area with a number of times the item has been scanned.

At block 730, the computer device determines that the number of the detected units of the item does not match the number of times the item has been scanned.

At block 735, in response to the determination, the computer device adjusts a shopping list (e.g., 305 of FIG. 3) displayed on the self-checkout machine to reflect the number of the detected units of the item in the bagging area.

In some embodiments, the image of the bagging area may be captured by a camera integrated with the self-checkout machine.

In some embodiments, determining that the number of the detected units of the item does not match the number of times the item has been scanned may comprise identifying that the number of the detected units of the item is higher than the number of times the item has been scanned.

In some embodiments, in response to the determination, the computer device may generate an alert indicating the mismatch, and display the alert on a user interface of the self-checkout machine.

In some embodiments, in response to the determination, the computer device may generate an alert indicating the mismatch, and transmit the alert to a control system configured to notify a staff member to perform a manual check of the bagging area.

In some embodiments, determining that the number of the detected units of the item does not match the number of times the item has been scanned may comprise identifying that the number of the detected units of the item is lower than the number of times the item has been scanned.

In some embodiments, adjusting the shopping list may comprise increasing a quantity of the item on the shopping list to match the number of the detected units of the item in the bagging area.

In some embodiments, training the CNN may comprise accessing the training dataset comprising a plurality of training images of the item, extracting one or more input features from the plurality of training images for the item, and adjusting one or more internal parameters of the CNN to correlate the one or more input features to the item.

In some embodiments, the CNN may comprise one or more hidden layers and one fully connected layer, each layer comprising one or more neurons, and adjusting the one or more internal parameters of the CNN may comprise adjusting weights or bias of the one or more neurons to correlate the one or more input features to the item.

FIG. 8 depicts an example computing device 800 configured to perform various aspects of the present disclosure, according to some embodiments of the present disclosure. Although depicted as a physical device, in some embodiments, the computing device 800 may be implemented using virtual device(s), and/or across a number of devices (e.g., in a cloud environment). In some embodiments, the example computer device may correspond to the self-checkout machine 100 as depicted in FIG. 1.

As illustrated, the computing device 800 includes a CPU 805, memory 810, storage 815, one or more network interfaces 825, and one or more I/O interfaces 820. In the illustrated aspect, the CPU 805 retrieves and executes programming instructions stored in memory 810, as well as stores and retrieves application data residing in storage 815. The CPU 805 is generally representative of a single CPU and/or GPU, multiple CPUs and/or GPUs, a single CPU and/or GPU having multiple processing cores, and the like. The memory 810 is generally considered to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the computing device 800 can be communicatively coupled with one or more other devices and components (e.g., via a network, which may include the Internet, local network(s), and the like). As illustrated, the CPU 805, memory 810, storage 815, network interface(s) 825, and I/O interface(s) 820 are communicatively coupled by one or more buses 830.

In the illustrated aspect, the memory 810 includes a multiple scan detection component 850, an image analysis component 855, a model training component 860, a validation component 865, and an alert & adjustment component 870. Although depicted as discrete components for conceptual clarity, in some aspects, the operations of the depicted components (and others not illustrated) may be combined or distributed across any number of components. Further, although depicted as software residing in memory 810, in some aspects, the operations of the depicted components (and others not illustrated) may be implemented using hardware, software, or a combination of hardware and software.

In one embodiment, the multiple scan detection component 850 may monitor the scanning process and identify repeated scans of the same item, whether these scans occur consecutively or non-consecutively within the same transaction. In one embodiment, the image analysis component 855 may use trained ML models to process images captured by cameras for the bagging area. By analyzing the images, the image analysis component 855 may detect the presence of the items that have been scanned multiple times and count the exact number of the items placed in the bagging area. In one embodiment, the model training component 860 may train the ML models used by the image analysis component 855. The component 860 may utilize historical image data to teach the model how to accurately recognize and count items in various conditions. In one embodiment, the validation component 865 may compare the scanned count of an item with the detected count from the image analysis component 855. If a discrepancy is found, the component 865 may send a signal to the alert & adjustment component 870 for further actions. In one embodiment, the alert & adjustment component 870 may implement actions when discrepancies are detected. If the detected count does not match the scanned count, the alert & adjustment component 870 may adjust the shopping list (e.g., 305 of FIG. 3) to reflect the correct number. In some embodiments, the alert & adjustment component 870 may generate a notice (e.g., 405 of FIG. 4) for the customer, prompting the customer to review the scanned items. In some embodiments, the alert & adjustment component 870 may send an alert to the administrative control system, indicating that manual verification is required at a specific self-checkout machine.

In the illustrated example, the storage 815 may include a variety of data for effective operation and continuous improvement of the multiple scan validation system. The data may include, but is not limited to, images 875 of the bagging area captured by the device's camera, trained ML models 880, alerts and notifications 885 generated during transactions. In some aspects, the aforementioned data may be saved in a remote database that connects to the computing device 800 via a network (e.g., the Internet).

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more of the described embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the described embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the described embodiments.

Aspects of the described embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a described manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged for the computing resources actually used (e.g. an amount of storage space consumed by a user or a number of virtualized systems instantiated by the user). A user can access any of the resources that reside in the cloud at any time, and from anywhere across the Internet. In context of the described embodiments, a user may access applications (e.g., multiple scan validation application) or related data available in the cloud. For example, the multiple scan validation application may perform data processing and generate corresponding instructions through a cloud computing infrastructure, and store the relevant results in a storage location in the cloud. Doing so allows a user to access this information from any computing system attached to a network connected to the cloud (e.g., the Internet).

While the foregoing is directed to one or more embodiments, other and further embodiments may be devised without departing from the basic scope thereof, and the scope thereof is determined by the claims that follow.

What is claimed is:

1. A method comprising:
receiving a plurality of inputs indicating more than one scan of an item at a self-checkout machine;
capturing an image of a bagging area of the self-checkout machine in response to the plurality of inputs;
training a convolutional neural network (CNN) to recognize the item based on a training dataset and a selected training algorithm;
detecting one or more units of the item in the bagging area from the image using the trained CNN;
comparing a number of the detected units of the item in the bagging area with a number of times the item has been scanned;
determining that the number of the detected units of the item does not match the number of times the item has been scanned; and
in response to the determination, adjusting a shopping list displayed on the self-checkout machine to reflect the number of the detected units of the item in the bagging area.

2. The method of claim 1, wherein the image of the bagging area is captured by a camera integrated with the self-checkout machine.

3. The method of claim 1, wherein determining that the number of the detected units of the item does not match the number of times the item has been scanned comprises identifying that the number of the detected units of the item is higher than the number of times the item has been scanned.

4. The method of claim 3, further comprising:
in response to the determination, generating an alert indicating the mismatch; and
displaying the alert on a user interface of the self-checkout machine.

5. The method of claim 3, further comprising:
in response to the determination, generating an alert indicating the mismatch; and
transmitting the alert to a control system configured to notify a staff member to perform a manual check of the bagging area.

6. The method of claim 1, wherein determining that the number of the detected units of the item does not match the number of times the item has been scanned comprises identifying that the number of the detected units of the item is lower than the number of times the item has been scanned.

7. The method of claim 6, wherein adjusting the shopping list comprises increasing a quantity of the item on the shopping list to match the number of the detected units of the item in the bagging area.

8. The method of claim 1, wherein training the CNN comprises:
- accessing the training dataset comprising a plurality of training images of the item;
- extracting one or more input features from the plurality of training images for the item; and
- adjusting one or more internal parameters of the CNN to correlate the one or more input features to the item.

9. The method of claim 8, wherein the CNN comprises one or more hidden layers and one fully connected layer, each layer comprising one or more neurons, and wherein adjusting the one or more internal parameters of the CNN comprises adjusting weights or bias of the one or more neurons to correlate the one or more input features to the item.

10. A system, comprising:
- one or more memories collectively containing one or more programs;
- one or more processors, wherein the one or more processors are configured to, individually or collectively, perform an operation comprising:
  - receiving a plurality of inputs indicating more than one scans of an item at a self-checkout machine;
  - capturing an image of a bagging area in response to the plurality of inputs;
  - training a convolutional neural network (CNN) to recognize the item based on a training dataset and a selected training algorithm; detecting one or more units of the item in a bagging area of the self-checkout machine from the image using the trained CNN;
  - comparing a number of the detected units of the item in the bagging area with a number of times the item has been scanned;
  - determining that the number of the detected units of the item does not match the number of times the item has been scanned; and
  - in response to the determination, adjusting a shopping list displayed on the self-checkout machine to reflect the number of the detected units of the item in the bagging area.

11. The system of claim 10, wherein the image of the bagging area is captured by a camera integrated with the self-checkout machine.

12. The system of claim 10, wherein determining that the number of the detected units of the item does not match the number of times the item has been scanned comprises identifying that the number of the detected units of the item is higher than the number of times the item has been scanned.

13. The system of claim 12, wherein the one or more processors are configured to, individually or collectively, perform the operation further comprising:
- in response to the determination, generating an alert indicating the mismatch; and
- displaying the alert on a user interface of the self-checkout machine.

14. The system of claim 12, wherein the one or more processors are configured to, individually or collectively, perform the operation further comprising:
- in response to the determination, generating an alert indicating the mismatch; and
- transmitting the alert to a control system configured to notify a staff member to perform a manual check of the bagging area.

15. The system of claim 10, wherein determining that the number of the detected units of the item does not match the number of times the item has been scanned comprises identifying that the number of the detected units of the item is lower than the number of times the item has been scanned.

16. The system of claim 15, wherein adjusting the shopping list comprises increasing a quantity of the item on the shopping list to match the number of the detected units of the item in the bagging area.

17. The system of claim 10, wherein training the CNN comprises: accessing the training dataset comprising a plurality of training images of the item;
- extracting one or more input features from the plurality of training images for the item; and
- adjusting one or more internal parameters of the CNN to correlate the one or more input features to the item.

18. The system of claim 17, wherein the CNN comprises one or more hidden layers and one fully connected layer, each layer comprising one or more neurons, and wherein adjusting the one or more internal parameters of the CNN comprises adjusting weights or bias of the one or more neurons to correlate the one or more input features to the item.

19. One or more non-transitory computer-readable media containing, in any combination, computer program code that, when executed by a computer system, performs an operation comprising:
- receiving a plurality of inputs indicating more than one scans of an item at a self-checkout machine;
- capturing an image of a bagging area in response to the plurality of inputs;
- training a convolutional neural network (CNN) to recognize the item based on a training dataset and a selected training algorithm;
- detecting one or more units of the item in a bagging area of the self-checkout machine from the image using the CNN;
- comparing a number of the detected units of the item in the bagging area with a number of times the item has been scanned;
- determining that the number of the detected units of the item does not match the number of times the item has been scanned; and
- in response to the determination, adjusting a shopping list displayed on the self-checkout machine to reflect the number of the detected units of the item in the bagging area.

20. The one or more or more non-transitory computer-readable media of claim 19, wherein determining that the number of the detected units of the item does not match the number of times the item has been scanned comprises identifying that the number of the detected units of the item is higher than the number of times the item has been scanned, and
- wherein the computer program code that, when executed by the computer system, performs the operation comprising:
  - in response to the determination, generating an alert indicating the mismatch; and
  - displaying the alert on a user interface of the self-checkout machine.

* * * * *